(12) United States Patent
Rentsch-Smith et al.

(10) Patent No.: US 9,638,816 B2
(45) Date of Patent: May 2, 2017

(54) ATTENUATING NOISE ACQUIRED IN AN ENERGY MEASUREMENT

(71) Applicant: WesternGeco L.L.C., Houston, TX (US)

(72) Inventors: Susanne Rentsch-Smith, Hove (GB); Ali Ozbek, Milton (GB); Wouter Gerrit Brouwer, Uckfield (GB); Jason Gardner, Houston, TX (US)

(73) Assignee: WESTERNGECO L.L.C., Houston, TX (US)

( * ) Notice: Subject to any disclaimer, the term of this patent is extended or adjusted under 35 U.S.C. 154(b) by 140 days.

(21) Appl. No.: 14/396,364

(22) PCT Filed: Apr. 23, 2013

(86) PCT No.: PCT/US2013/007715
§ 371 (c)(1),
(2) Date: Oct. 22, 2014

(87) PCT Pub. No.: WO2013/163131
PCT Pub. Date: Oct. 31, 2013

(65) Prior Publication Data
US 2015/0109882 A1 Apr. 23, 2015

Related U.S. Application Data

(60) Provisional application No. 61/636,965, filed on Apr. 23, 2012.

(51) Int. Cl.
*G01V 1/30* (2006.01)
*G01V 1/36* (2006.01)

(52) U.S. Cl.
CPC .......... *G01V 1/364* (2013.01); *G01V 2210/30* (2013.01); *G01V 2210/3246* (2013.01); *G01V 2210/3248* (2013.01)

(58) Field of Classification Search
CPC ............. G01V 1/36; G01V 2210/3246; G01V 2210/30; G01V 2210/3248; G01V 1/364
(Continued)

(56) References Cited

U.S. PATENT DOCUMENTS 3,576,522 A    4/1971  Doty et al.
4,209,854 A *  6/1980  Ruehle .................. G01V 1/362
                                                    367/43

(Continued)

FOREIGN PATENT DOCUMENTS

GB    1208424 A    10/1970
GB    2458642 A    9/2009
WO    9960423 A1   11/1999

OTHER PUBLICATIONS

International Search Report and Written Opinion of PCT Application Serial No. PCT/US2013/037715 dated Aug. 13, 2013 (11 pages).

(Continued)

*Primary Examiner* — Daniel L Murphy

(57) ABSTRACT

A technique includes receiving sensor data; sorting the data into a gather representation that corresponds to a plurality of shots of an energy source; and determining a signal cone based at least in part on at least one characteristic of the gather representation. The technique includes processing the sensor data in a processor-based machine to attenuate noise to generate data representing a signal based at least in part on the determined signal cone and the gather representation.

16 Claims, 13 Drawing Sheets

(58) Field of Classification Search
USPC .................................................... 367/14, 38
See application file for complete search history.

(56) References Cited

U.S. PATENT DOCUMENTS

| | | | |
|---|---|---|---|
| 4,866,679 A | | 9/1989 | Chambers |
| 4,992,995 A | * | 2/1991 | Favret .................... G01V 1/36 367/43 |
| 5,150,331 A | | 9/1992 | Harris et al. |
| 5,491,669 A | | 2/1996 | Chambers |
| 5,648,938 A | * | 7/1997 | Jakubowicz ............. G01V 1/36 367/21 |
| 6,446,008 B1 | | 9/2002 | Ozbek |
| 6,636,810 B1 | | 10/2003 | Moore et al. |
| 6,651,007 B2 | | 11/2003 | Ozbek |
| 7,426,439 B2 | | 9/2008 | Ozdemir et al. |
| 8,773,949 B2 | | 7/2014 | Martin et al. |
| 2002/0138202 A1 | | 9/2002 | Martinez |
| 2008/0151689 A1 | * | 6/2008 | Goujon .................. G01V 1/364 367/24 |
| 2010/0315902 A1 | | 12/2010 | Liang et al. |
| 2011/0103183 A1 | | 5/2011 | Ozdemir et al. |
| 2012/0082000 A1 | | 4/2012 | Perciot et al. |

OTHER PUBLICATIONS

Ell, T. A., "Quaternion-Fourier Transforms for Analysis of Two-Dimensional Linear Time-Invariant Partial-Differential Systems," Proceedings of the 32nd IEEE Conference of Decision and Control, Dec. 1993 (pp. 1830-1841).

Stanton, Aaron and Sacchi, Mauricio, "Multicomponent Seismic Data Reconstruction Using the Quaternion Fourier Transform and POCS," SEG Expanded Abstracts, 2011 SEG Annual Meeting, San Antonio, TX (pp. 1267-1272).

European Search Report issued in related EP application 13781021.4 on May 25, 2016, 4 pages.

Office Action issued in related EP application 13781021.4 on Jun. 10, 2016, 7 pages.

Teigen, Ø., K. Özdemir, B. A. Kjellesvig and N. Goujon, 2012: Characterization of noise modes in multicomponent 4C towed-streamer; EAGE abstract 2012; (5 pages)

Özdemir, K., B. A. Kjellesvig and A. Özbek, 2012: Digital noise attenuation of particle motion data in a multicomponent 4C towed-streamer; EAGE abstract 2012; (5 pages).

International Preliminary Report on Patentability issued in the related PCT application PCT/US2013/037715, dated Oct. 28, 2014 (7 pages).

* cited by examiner

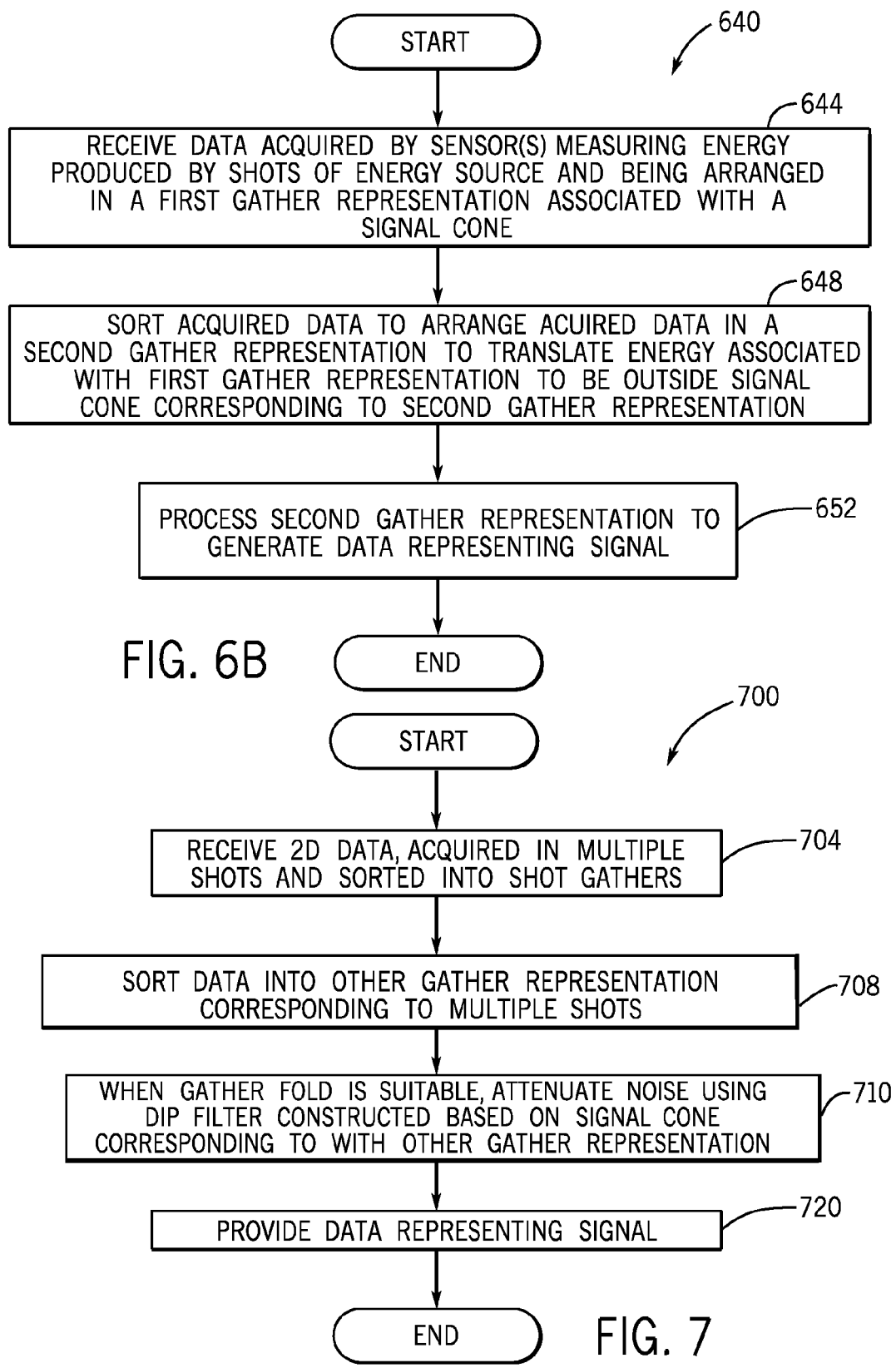

ATTENUATING NOISE ACQUIRED IN AN ENERGY MEASUREMENT

CROSS-REFERENCE TO RELATED APPLICATION

This application claims benefit of U.S. Provisional Patent App. Ser. No. 61/636,965 filed Apr. 23, 2012, which is herein incorporated by reference in its entirety.

BACKGROUND

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensor, both hydrophones and geophones, and/or other suitable sensor types. A typical measurement acquired by a sensor contains desired signal content (a measured pressure or particle motion, for example) and an unwanted content (or "noise").

SUMMARY

In an implementation, a technique includes receiving sensor data; sorting the data into a gather representation that corresponds to a plurality of shots of an energy source and determining a signal cone based at least in part on at least one characteristic of the gather representation. The technique includes processing the sensor data in a processor-based machine to attenuate noise to generate data representing a signal based at least in part on the determined signal cone and the gather representation.

In another implementation, a system includes an interface to receive sensor data; and a processor. The processor is adapted to sort the sensor data into a gather representation that corresponds to a plurality of shots of an energy source and determine a signal cone based at least in part on at least one characteristic of the gather representation. The processor is adapted to attenuate noise to generate data representing a signal based at least in part on the determined signal cone and the gather representation.

In another implementation, an article includes a non-transitory computer readable storage medium to store instructions that when executed by a computer cause the computer to receive sensor data; sort the sensor data into a gather representation that corresponds to a plurality of shots of an energy source; and determine a signal cone based at least in part on at least one characteristic of the gather representation. The instructions when executed cause the computer to process the sensor data to attenuate noise based at least in part on the determined signal cone and the gather representation.

In another implementation, a computing system includes a means for receiving sensor data; a means for sorting the sensor data into a gather representation corresponding to a plurality of shots of an energy source; a means for determining a signal cone based at least in part on at least one characteristic of the gather representation; and a means for attenuating noise to generate data representing a signal based at least in part on the determined signal cone and the gather representation.

In another implementation, an information processing apparatus for use in a computing system includes a means for receiving sensor data; a means for sorting the sensor data into a gather representation corresponding to a plurality of shots of an energy source; a means for determining a signal cone based at least in part on at least one characteristic of the gather representation; and a means for attenuating noise to generate data representing a signal based at least in part on the determined signal cone and the gather representation.

In further implementations, determining the signal cone includes determining the signal cone based at least in part on an additional travel path between traces for different energy source of shots.

In further implementations, attenuating the noise includes applying a linear or non-linear filter to the sorted data.

In further implementations, attenuating the noise includes selectively applying a filter to the sorted data based on a fold associated with the gather representation.

In further implementations, attenuating the noise includes based on the gather representation, constructing a model of the noise; and using the model to attenuate the noise.

In further implementations, attenuating the noise includes applying a dip filter selected from the group consisting essentially of a symmetric linear dip filter, an asymmetric linear dip filter, a dip filter that includes multiple linear dips; and a symmetric non-linear dip filter.

In further implementations, attenuating the noise includes, based on the gather representation, identifying a coherent part of the representation and a noise part of the representation; attenuating noise from the noise part of the representation to generate a compensated noise part; and combining the compensated noise part and the coherent part to generate data representing the signal.

In further implementations, the acquired data are sorted according to a streamer of a plurality of streamers and a source of a plurality of sources prior to the sorting of the data into the gather representation.

In further implementations, a filter is applied to the second gather representation to attenuate energy outside of the signal cone.

Advantages and other features will become apparent from the following drawings, description and claims.

BRIEF DESCRIPTION OF THE DRAWINGS

FIGS. 2, 6A, 6B, 7, 8, 10, 11, 12 and 13 are flow diagrams depicting techniques to attenuate noise acquired in energy measurements according to example implementations.

DETAILED DESCRIPTION

Systems and techniques are disclosed herein to perform noise attenuation on acquired sensor data by sorting the sensor data into a gather, which enhances discrimination of the noise so that the noise energy may be more easily targeted for removal. More specifically, systems and techniques are disclosed herein for purposes of attenuating noise that appears in data that represents an energy measurement, such as seismic data, although the systems and techniques may be applied to data other than seismic data, in accordance with further implementations.

For the case of acquired seismic data, the data may contain desired content (the seismic signal due to energy from one or more seismic sources being incident upon a geologic structure of interest) and undesired content (i.e., "noise"). Moreover, the acquired data may initially be organized, or sorted, into common shot gathers (groups of data associated with particular shots, or energy source firings) in which the noise is generally coherent with respect to the seismic signal, thereby presenting challenges to attenuating the noise without also removing signal content. However, the noise may be relatively incoherent, or "random," with respect to the seismic signal in a gather other than a common shot gather; and as such, systems and techniques that are disclosed herein to sort, or reorder, the acquired data into a gather in which the noise appears to be relatively random, or incoherent, with respect to the signal. More specifically, the systems and techniques disclosed herein exploit the relationship that coherent noise in a common shot gather may become random in other gathers, such as a common offset gather, a common receiver gather or a common midpoint gather, as examples.

In the context of the application, "noise" generally refers to the energy represented by the acquired data other than the energy associated with the desired signal. For example, for the case of a towed-based seismic survey, the noise may be attributable to the towed streamer being subject to several modes of vibration due to water flowing about the streamer cable. These vibrations include, as examples, longitudinal, transversal and torsional vibrations. A description of noise modes in a multicomponent towed streamer may be found, for example in the article by Teigen, Ø., K. Özdemir, B. A. Kjellesvig and N. Goujon, entitled, "Characterization of Noise Modes in Multicomponent 4C Towed-Streamer," EAGE Abstract (2012), which is hereby incorporated by reference in its entirety. It is noted that the "noise" may be attributable to sources other than a flow-induced noise source, depending on the particular implementation. As another example, the noise may be tug noise.

Figure 1:
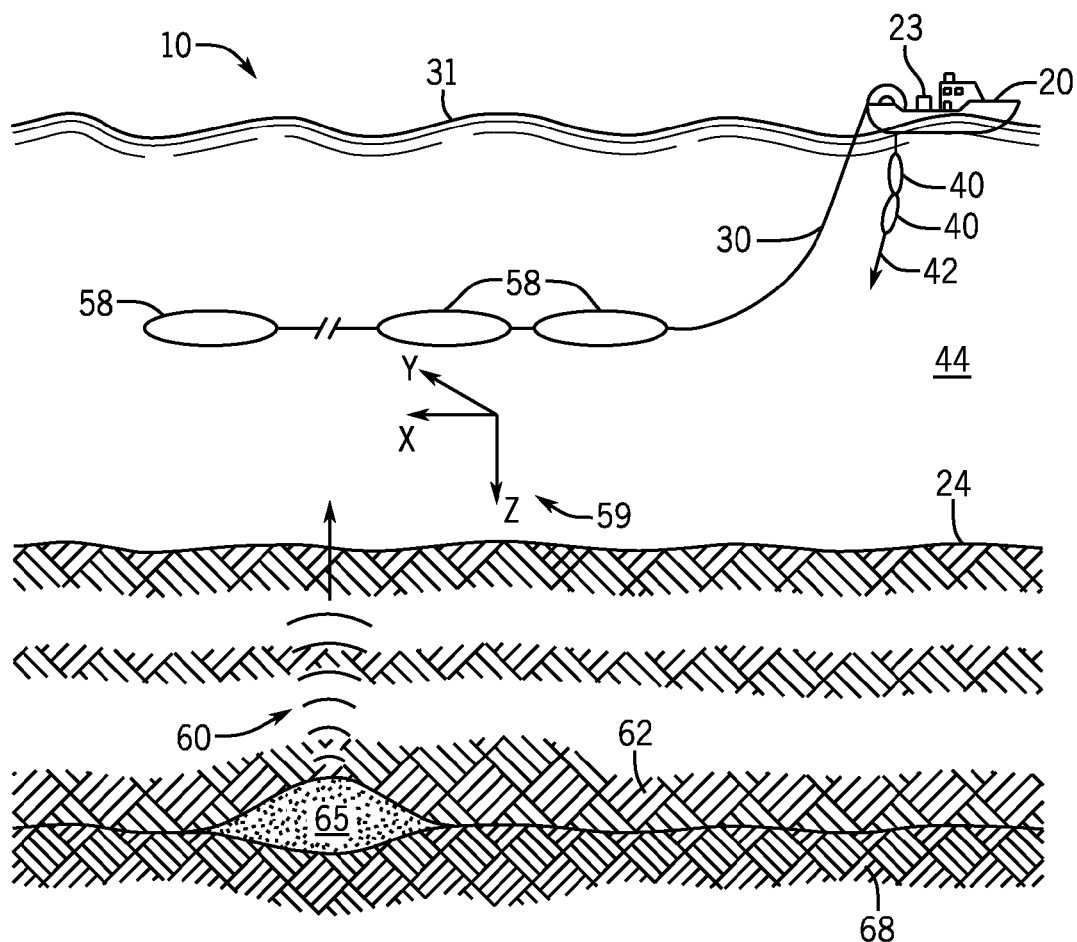
FIG. 1 is a schematic diagram of a seismic acquisition system according to an example implementation.

Referring to FIG. 1, in accordance with example implementations disclosed herein, the data that are processed to attenuate noise are acquired by seismic receivers, or sensors, which are towed as part of a marine-based seismic data acquisition system 10. However, it is noted that the systems and techniques that are disclosed herein may be applied to data acquired by other seismic data acquisitions systems, such as ocean bottom, land and transition zone-based seismic data acquisition systems. Moreover, the systems and techniques disclosed herein may be applied to data acquired by non-seismic data acquisition systems, such as electromagnetic or magneto telluric data acquisition systems. In further implementations, the systems and techniques that are disclosed herein may be applied to attenuate noise present, in general, in any data acquired by sensors, which is due to energy from one or more energy sources being incident upon geologic as well as non-geologic structures (biological structures (tissue, for example) and surface structures, as examples). Thus, the noise attenuation techniques and systems that are disclosed herein may be applied, in general, to acquired sensor data to attenuate noise contained in the data, regardless of the particular system, which acquires the data or the specific use of the data.

Referring to the example marine-based seismic data acquisition system 10 of FIG. 1, a survey vessel 20 tows one or more seismic streamers 30 (one exemplary streamer 30 being depicted in FIG. 1) behind the vessel 20. It is noted that the streamers 30 may be arranged in an array, or spread, in which multiple streamers 30 are towed in approximately the same plane at the same depth. As another non-limiting example, the streamers may be towed at multiple depths, such as in an over/under spread, for example. Moreover, the streamers 30 of the spread may be towed in a coil acquisition configuration and/or at varying depths or slants, depending on the particular implementation.

The streamer 30 may be several thousand meters long and may contain various support cables (not shown), as well as wiring and/or circuitry (not shown) that may be used to support communication along the streamer 30. In general, the streamer 30 includes a primary cable into which is mounted seismic sensors that record seismic signals. In accordance with example implementations, the streamer 30 contains seismic sensor units 58, each of which contains a multi-component sensor. The multi-component sensor includes a hydrophone and particle motion sensors, in accordance with some implementations. Thus, each sensor unit 58 is capable of detecting a pressure wavefield and at least one component of a particle motion that is associated with acoustic signals that are proximate to the sensor. Examples of particle motions include one or more components of a particle displacement, one or more components (inline (x), crossline (y) and vertical (z) components (see axes 59, for example)) of a particle velocity and one or more components of a particle acceleration.

Depending on the particular implementation, the multi-component sensor may include one or more hydrophones, geophones, particle displacement sensors, particle velocity sensors, accelerometers, pressure gradient sensors, or combinations thereof.

As a more specific example, in accordance with some implementations, a particular multi-component sensor may include a hydrophone for measuring pressure and three orthogonally-aligned accelerometers to measure three corresponding orthogonal components of particle velocity and/or acceleration near the sensor. It is noted that the multi-component sensor may be implemented as a single device (as depicted in FIG. 1) or may be implemented as a plurality of devices, depending on the particular embodiment of the invention. A particular multi-component sensor may also include pressure gradient sensors, which constitute another type of particle motion sensors. Each pressure gradient sensor measures the change in the pressure wavefield at a particular point with respect to a particular direction.

In addition to the streamers 30 and the survey vessel 20, marine seismic data acquisition system 10 includes at least one seismic source 40, such as the two exemplary seismic sources 40 that are depicted in FIG. 1, such as air guns and the like. In some implementations, the seismic sources 40 may be coupled to, or towed by, the survey vessel 20. Alternatively, in other implementations, the seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are created by the seismic sources 40 produce corresponding reflected acoustic signals, or pressure waves 60, which are sensed by the seismic sensors of the streamer(s) 30. It is noted that the pressure waves that are received and sensed by the seismic sensors include "up going" pressure waves that propagate to the sensors without reflection, as well as "down going" pressure waves that are produced by reflections of the pressure waves 60 from an air-water boundary, or free surface 31.

The seismic sensors of the streamers 30 generate signals (digital signals, for example), called "traces," which form the acquired measurements of the pressure wavefield and particle motion. The traces are recorded as seismic data and may be at least partially processed by a signal processing unit 23 that is deployed on the survey vessel 20, in accordance with some implementations. For example, a particular multi-component sensor may provide a trace, which corresponds to a measure of a pressure wavefield by its hydrophone; and the sensor may provide (depending on the particular implementation) one or more traces that correspond to one or more components of particle motion.

A goal of the seismic acquisition may be to build up an image of a survey area for purposes of identifying subterranean geological formations, such as the example geological formation 65. Subsequent analysis of the representation may reveal probable locations of hydrocarbon deposits in subterranean geological formations. Moreover, the seismic data may be processed to determine an elastic model and identify formation properties, fluid properties and the lithology of the formation. Depending on the particular implementation, portions of the analysis of the seismic data may be processed by a local data processing system on the seismic survey vessel 20 (such as by the signal processing unit 23) or may be processed by a remote seismic data processing system that may be, for example, located on land or on the vessel 20. Thus, many variations are possible and are within the scope of the appended claims.

The acquired data may be processed in multiple noise attenuation stages using one or multiple noise attenuation techniques, depending on the particular implementation. As an example, the acquired data may first be processed (in accordance with an example implementation) to attenuate noise by applying a multi-scale noise attenuation technique, such as the technique that is disclosed in U.S. Patent Application Publication No. 2011/0103182, entitled, "Removing Noise From A Seismic Measurement," which was filed on Mar. 11, 2009, and is hereby incorporated by reference in its entirety. After this noise attenuation, residual low frequency noise may be present in both the pressure and particle motion data. Regardless if such noise attenuation or other noise attenuation technique(s) are applied or not, the acquired seismic data may be processed using a technique 200, which is depicted in FIG. 2.

Figure 2:
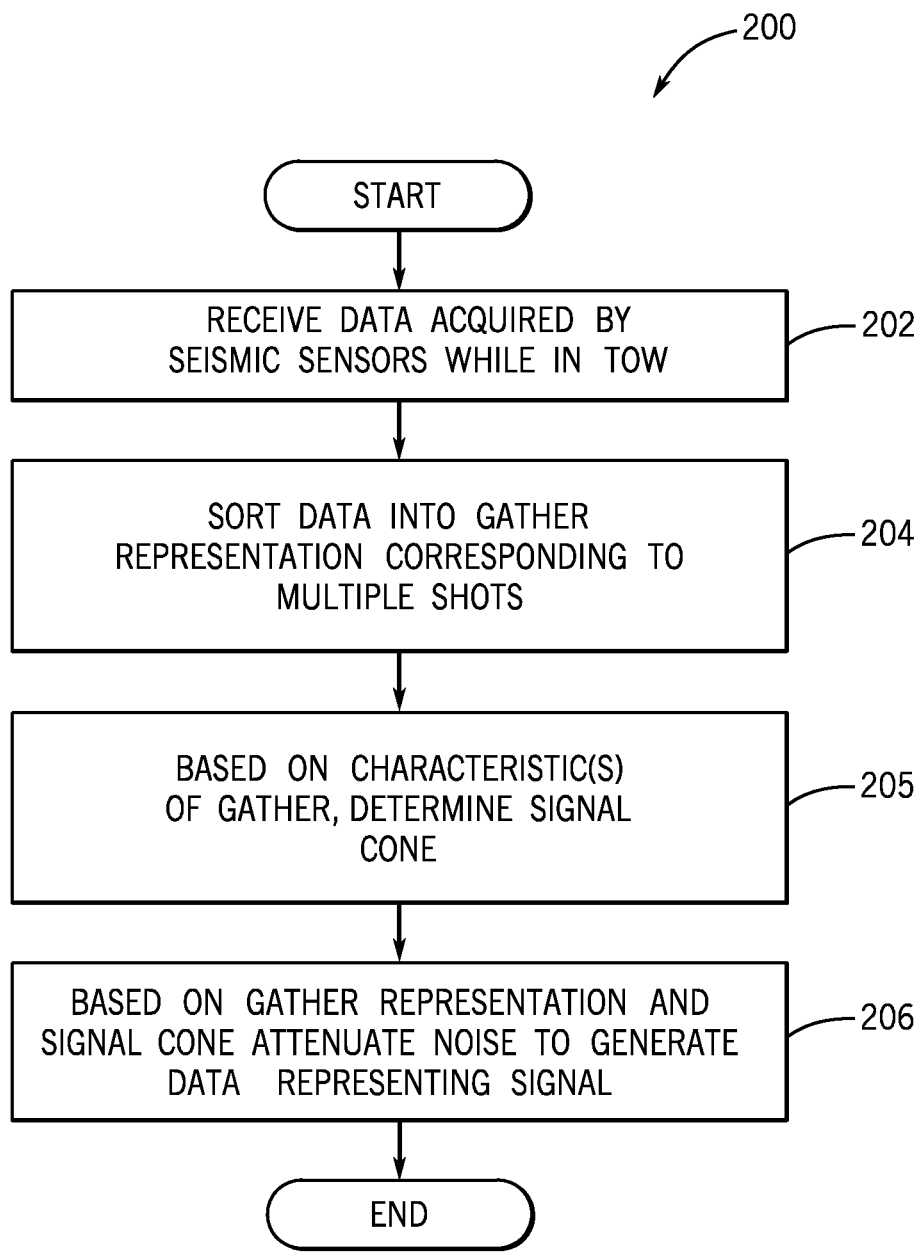

Referring to FIG. 2, in accordance with example implementations, the technique 200 includes receiving (block 202) data acquired by seismic sensors while in tow. It is noted that the received data may or may not be first processed using another noise attenuation technique, as described above. The received data, being initially arranged in a first gather representation (in shot gathers, for example), are sorted (block 204) into a gather representation that corresponds to multiple shots (i.e., a gather representation other than a shot gather representation). Based on one or more characteristics of the gather representation, a signal cone is determined, as further disclosed herein, pursuant to block 205. The technique 200 further includes attenuating noise (block 206) to generate data representing the signal based on the gather representation and the determined signal cone.

Figure 3:
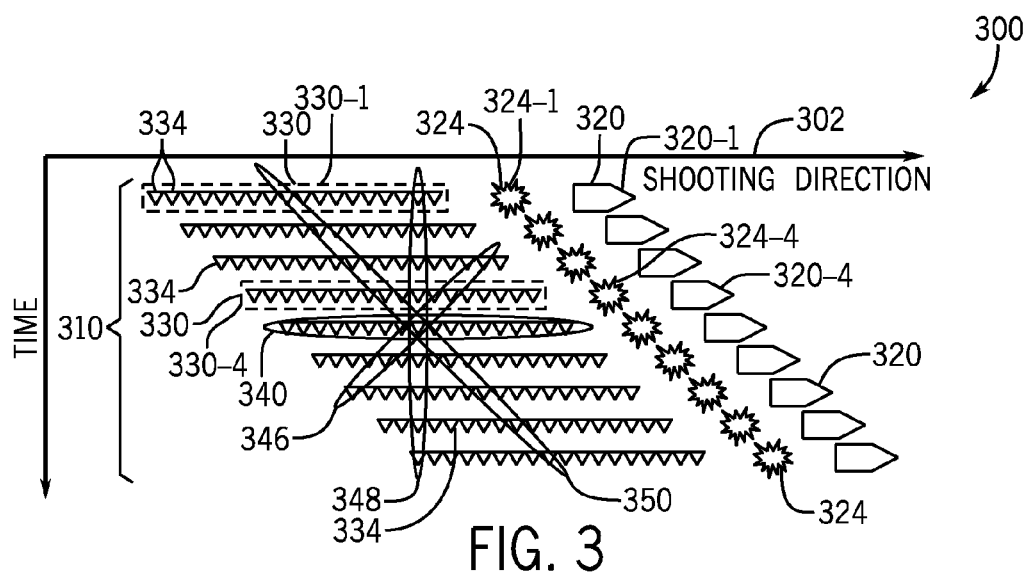
FIG. 3 is an illustration of different data gathers according to example implementations.

FIG. 3 generally depicts an illustration 300 of example gathers. In particular, FIG. 3 depicts the spatial sensor positions for a given streamer 330 for different times (along a vertical axis) and for different shots 324 (shots 324-1 and 324-4 being specifically depicted in FIG. 3), which occurs at different positions, which is represented by a shooting direction 302 along the horizontal axis. The notation "gather" refers to how the data are organized, or sorted. In this regard, for a given shot 324, the acquired data from all of the sensors (as an example) of a given streamer 330 for this shot 324 form a common shot gather 340. For example, for the shot 324-1, the data sensed by the sensors 334 for this shot (represented by reference numeral 330-1) form a particular shot gather. Data from different shots 324, however, may be organized to form gathers other than a shot gather. For example, the illustration 300 also depicts a common midpoint gather 346, which contains sensor data from multiple shots 324 and which are associated with a common streamer midpoint.

The illustration 300 also depicts a common receiver gather 348. For the case of a stationary acquisition system, a common receiver gather representation in which data from different shots from the same, or common, receiver are grouped, or organized, together. For the case of a moving towed survey, such as the one depicted in FIG. 3, however, it is noted that the common receiver gather is in reality a common surface point representation in that the data are associated with a common stationary surface point. To maintain an analogy between a stationary survey system (an ocean bottom cable, for example) and a towed seismic survey system, the gather 348 is described as a "common receiver gather," although it is understood that for the towed seismic acquisition system, the gather 348 is not associated with a common sensor, or receiver, but rather, is associated with a common stationary surface point.

Figure 4:
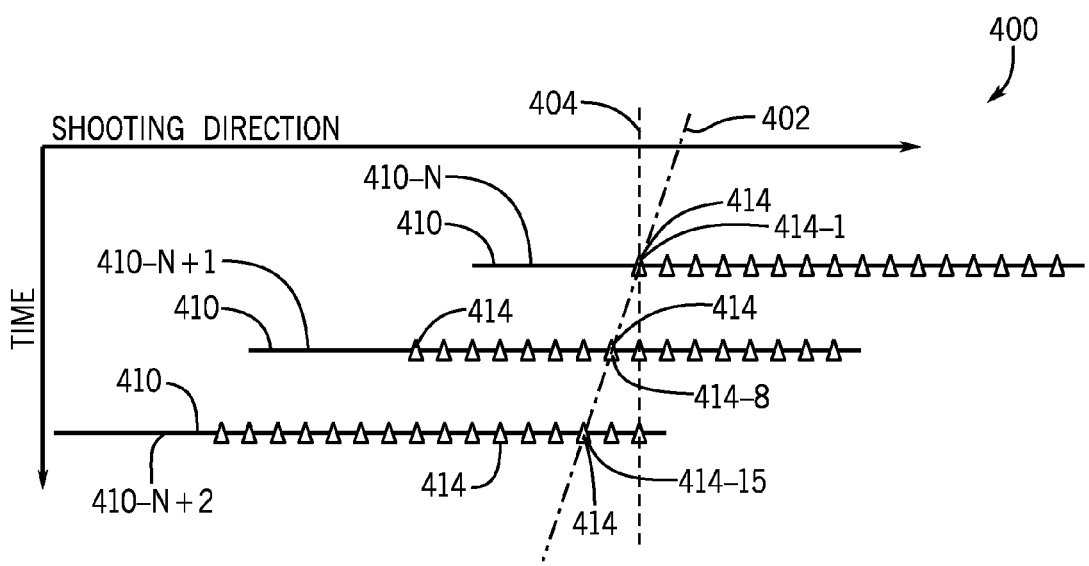
FIG. 4 is an illustration of a generalized virtual common receiver gather according to an example implementation.

The acquired data may be sorted into other gathers, in accordance with the various potential example implementations. For example, FIG. 4 depicts an illustration of a generalized virtual receiver gather 400. The gather 400 is formed from data groups 410 (data groups 410-N, 410-N+1 and 410-N+2, being depicted in FIG. 4 as examples) that correspond to corresponding shots. The gather 400 includes selected data from the data groups 410, which are associated with various sensors 414 (sensors 414-1, 414-8 and 414-15, being depicted in FIG. 4 as examples), which are not necessarily located with respect to the midpoint of a given data group 410. In this manner, the gather 400 represents a common surface point, illustrated by dash line 404.

In general, noise, which appears to be coherent for one gather (a shot gather, for example), may not be necessarily coherent for another gather (the common offset gather or the common receiver gather, as examples). In general, the random nature of the noise causes more energy content to be mapped outside of the signal cone (which contains the desired seismic signal) in some gathers (as compared to the shot gather, for example) than in others. This effect, in turn, is exploited by the systems and techniques disclosed herein for purposes of attenuating the noise energy, which appears outside of the signal cone.

The "signal cone," in the context of the application, refers to the largest theoretical region that the seismic signal can occupy in the frequency-wavenumber spectral domain. Equivalently, the signal cone may be similarly expressed in the Radon or other transform domains. In the frequency-wavenumber spectral domain, the signal cone is a triangular region that is delimited by the slowest apparent velocity that can be observed. The theoretical signal cone can be computed by considering a signal traveling in the same plane that the sensors and sources are configured. In the marine scenario of a streamer towed without a slant and the sources being in line with that streamer, the slowest possible event originates from a vertical reflector or diffraction point in the source-receiver plane. The distance of the reflector or diffraction point to the sources or sensors may not be considered relevant in the determination of the signal cone, in accordance with example implementations. The minimum apparent velocity "c" that defines the boundaries of the theoretical signal cone may be calculated as follows:

$$c = \frac{c_0 ds}{\Delta A}.$$  Eq. 1

In Eq. 1, "$c_0$" represents the velocity of sound in water, "ds" represents the trace spacing in the considered domain spacing, and "$\Delta A$" represents the additional travel path a wave travels in the source and receiver plane between traces for different shots. The slowest apparent velocity defining the boundaries of the theoretical signal cones for all possible gathers varies between half the velocity of sound in water (for instance in the common offset domain or common midpoint domain) and the velocity of sound in water (for instance in the common shot domain or common receiver point domain). Below is a table with velocities defining the theoretical signal cone in the domains depicted in FIG. 3. More generalized domains as depicted in FIG. 4 may have a signal cone of minimum apparent velocities that vary between these two limits.

| Domain | ds | $\Delta A$ | c |
|---|---|---|---|
| Common shot | Sensor spacing | 1x sensor spacing | $c_0$ |
| Common offset | Shot spacing | 2x shot spacing | $c = c_0/2$ |
| Common receiver point | Shot spacing | 1x shot spacing | $c_0$ |
| Common midpoint | Shot spacing | 2x shot spacing | $c = c_0/2$ |

The maximum frequency ($f_{max}$) that may lie outside of the signal cone (and thus, the signal cone boundaries) may be defined by the following expression:

$$f_{max} = c \cdot k_{Nyquist},$$  Eq. 2 where "$k_{Nyquist}$" may be described as follows:

$$k_{Nyquist} = \frac{1}{2 \cdot ds}.$$  Eq. 3

In Eq. 2, $f_{max}$ is the highest temporal frequency at which noise attenuation would be applied. As an example, for a 25 meter (m) nominal shot spacing, the $f_{max}$ maximum frequency is 15 Hertz (Hz) in the common offset gather representation and 30 Hz in the common receiver point gather representation, assuming that the propagation velocity is 1500 m/s.

Figure 5C:
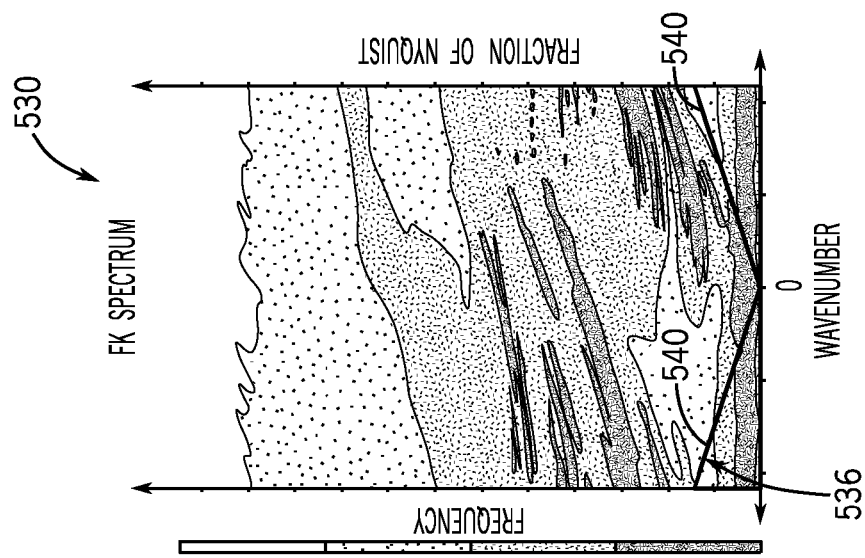
FIG. 5C is an illustration of energy in the frequency-wavenumber domain of a receiver gather according to an example implementation.
Figure 5B:
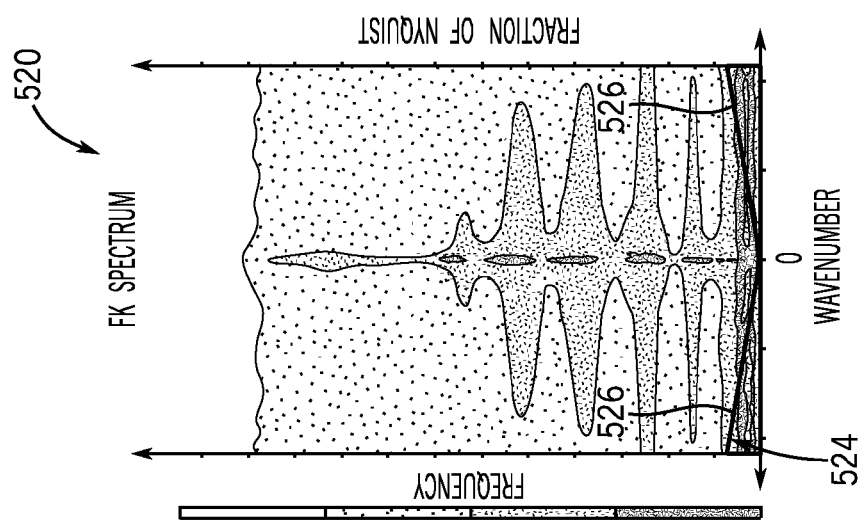
FIG. 5B is an illustration of energy in the frequency-wavenumber of an offset gather according to an example implementation.
Figure 5A:
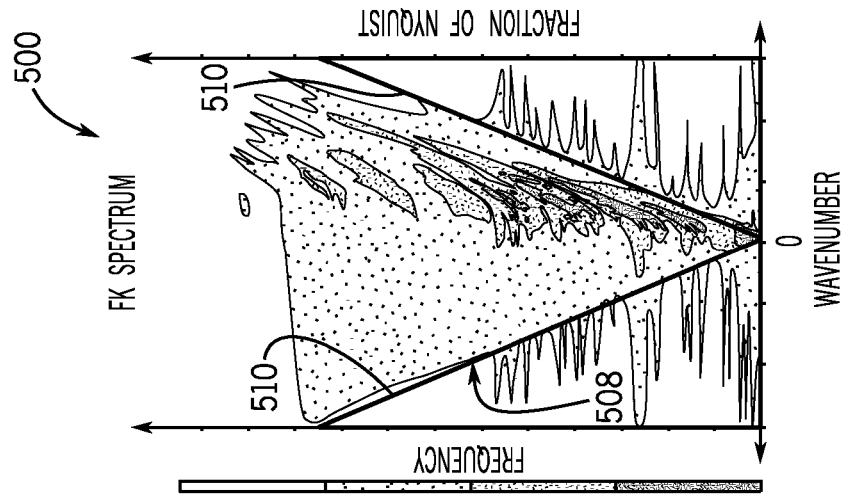
FIG. 5A is an illustration of energy in the frequency-wavenumber domain of a shot gather according to an example implementation.

For example, FIG. 5A depicts sensed energy 500 in the frequency-wavenumber domain for data arranged in a shot domain gather and a corresponding signal cone 508, which has corresponding boundaries 510. Ideally, the desired signal content is inside the frequency-wavenumber space defined by the boundaries 510, and the noise energy is outside of the boundaries 510. FIG. 5B depicts an example signal cone 524 (having boundaries 526) for the same acquired data sorted into an offset gather; and FIG. 5C depicts an example signal cone 536 (having boundaries 540) for energy 530 for the same acquired data sorted into a receiver gather.

A frequency-wavenumber space-based filter may be used to remove energy content outside of the signal cone, thereby ideally attenuating noise from the acquired data. However, for the example of FIG. 5A, the noise is relatively coherent with respect to the signal; and as such, a considerable amount of noise energy is inside the signal cone 508. However, for the offset gather (see FIG. 5B), significantly more energy is located outside of the signal cone 524. As such, applying a filter in the frequency-wavenumber space outside of the signal cone 524 for the offset gather significantly attenuates relatively more noise than a filter that filters energy outside the signal cone 508 of FIG. 5A. Likewise, for the receiver gather (see FIG. 5C), significantly more energy for this example is disposed outside of the signal cone 536 as compared to FIG. 5A. Therefore, applying a filter outside of the signal cone 536 also attenuates a significant amount of noise.

Figure 6A:
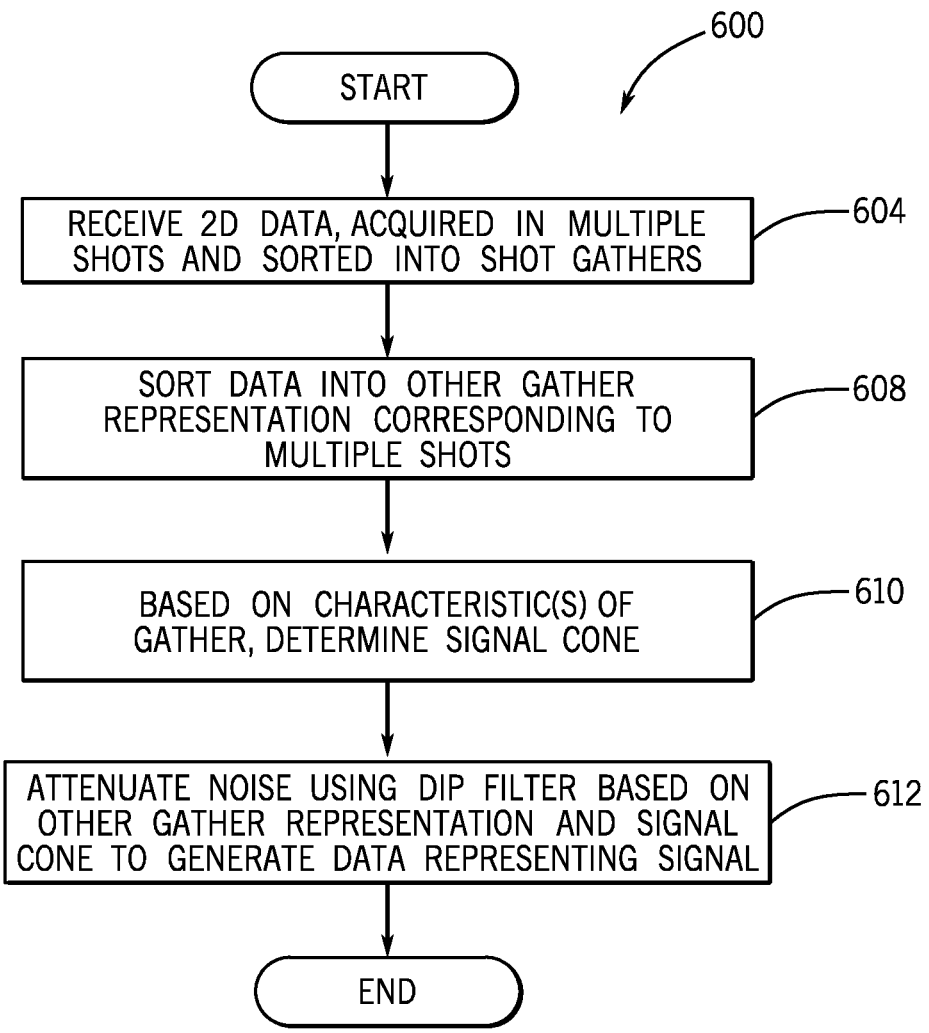

In accordance with example implementations, noise outside of the signal cone may be attenuated using a "dip" filter which removes energy content outside of the signal cone, whose boundaries are defined by the theoretical minimum velocity of the signal. Therefore, referring to FIG. 6A, in accordance with example implementation, a technique 600 includes receiving (block 604) two-dimensional (2-D) data, in which multiple shots are sorted into a shot gather representation. In the context of this application, "2-D" refers to data acquired along a particular sensor line. For the case of a towed marine-based seismic data acquisition system, the "2-D data" refers to the data acquired along by the sensors of a particular streamer. Continuing the example, the technique 600 includes sorting (block 608) the received data into another gather representation, which corresponds to multiple shots. The technique 600 includes attenuating noise (block 612) using a dip filter based on this other gather representation and a signal cone that is determined for this other gather representation.

For example, in accordance with some implementations, the dip filter may be designed based on a predetermined signal velocity that is the minimum theoretical velocity at which a horizontal plane wave associated with the signal travels. In further implementations, the predetermined signal velocity may be a velocity that is lower than the minimum theoretical velocity for purposes of avoiding inadvertently attenuating signal content. In further implementations, the predetermined signal velocity may be a velocity that is higher than the minimum theoretical velocity for purposes of attenuating more noise. Criteria other and/or in addition to a predetermined signal velocity may be used to design the dip filter; and filters other than dip filters may be employed, in accordance with further implementations.

To generalize, referring to FIG. 6B, a technique 640 includes receiving (block 644) data acquired by at least one sensor while in tow measuring energy produced by at least one shot of an energy source and being arranged in a first gather representation associated with a signal cone. The technique 640 includes sorting (block 648) the acquired data to arrange the acquired data in a second gather representation to translate energy associated with the first gather representation to be outside a signal cone that corresponds to a second gather representation. The technique 640 further includes processing (block 652) the second gather representation to generate data representing the signal.

In accordance with example implementations, the maximum theoretically achievable noise reduction may not be achieved using the above-described filtering for several reasons. For example, for the relatively low frequencies, a low pass filter may be already subsequently applied in the preconditioning of the acquired data. For relatively higher frequencies, the noise already decays for these frequencies.

Common offset domain gather sorting may be achieved, in accordance with example implementations by using a trace number data header literal, which selects data from the same physical sensor so that the data from the same sensor from multiple shots are sorted into one gather. As another example, the offset literals may be used to sort the data by using the literals that represent the true source and receiver offset. The common receiver point domain sorting may be achieved using a nominal literal based on the tow speed of the spread or, for example, using the true subsurface point coordinate. It is noted that a geometry database may be used for purposes of sorting the headers, in accordance with example implementations.

For purposes of avoiding attenuating the desired signal that is close to the limits of the theoretical signal cone boundaries, the filter may be designed based on velocities that are lower than the theoretically slowest seismic velocity, and a filter order may be selected that is relatively steep without introducing significant artifacts.

In accordance with example implementations, application of the dip filter may assume that a minimum gather fold exists. In this manner, a "minimum gather fold" refers to a minimum number of traces to be used before proper dip filtering may occur. In this manner, as can be seen from FIG. 3, the common midpoint gather 346 may, for a particular dataset, contain data for one or a significantly low number of sensors (a number less than 2, for example). Therefore, in accordance with example implementations, a determination may be made whether the gather fold is sufficient for applying the dip filter. Thus, referring to FIG. 7, in accordance with an example implementation, a technique 700 includes receiving (block 704) 2-D data, having multiple shots, and which are sorted into shot gathers. The technique 700 includes sorting (block 708) the received data into another gather representation, which corresponds to multiple shots. Pursuant to block 710 of the technique 700, when the gather fold is suitable, the technique 700 includes attenuating noise using a dip filter, which is constructed based on a signal cone that corresponds to the other gather representation. Data may then be provided, pursuant to block 720, which represent the signal.

In general, the dip filter may be any time-space, time-slowness or frequency-wavenumber dip filter, depending on the particular implementation. In this manner, a "time-slowness" filter refers to a filter such as the one described in U.S. Pat. No. 6,636,810," entitled "High-Resolution Radon Transform For Processing Seismic Data," which issued on Oct. 21, 2003, which is hereby incorporated by reference in its entirety. Moreover, the dip filter may be a more sophisticated filter, which applies velocity filtering and spatial anti-alias filtering in the frequency-wavenumber domain, such as the filter disclosed in for example, UK Patent Application GB 2458642, entitled, "FX-IIR Filter For Seismic Data," which published on Sep. 30, 2009, and is hereby incorporated by reference in its entirety.

Figure 9:
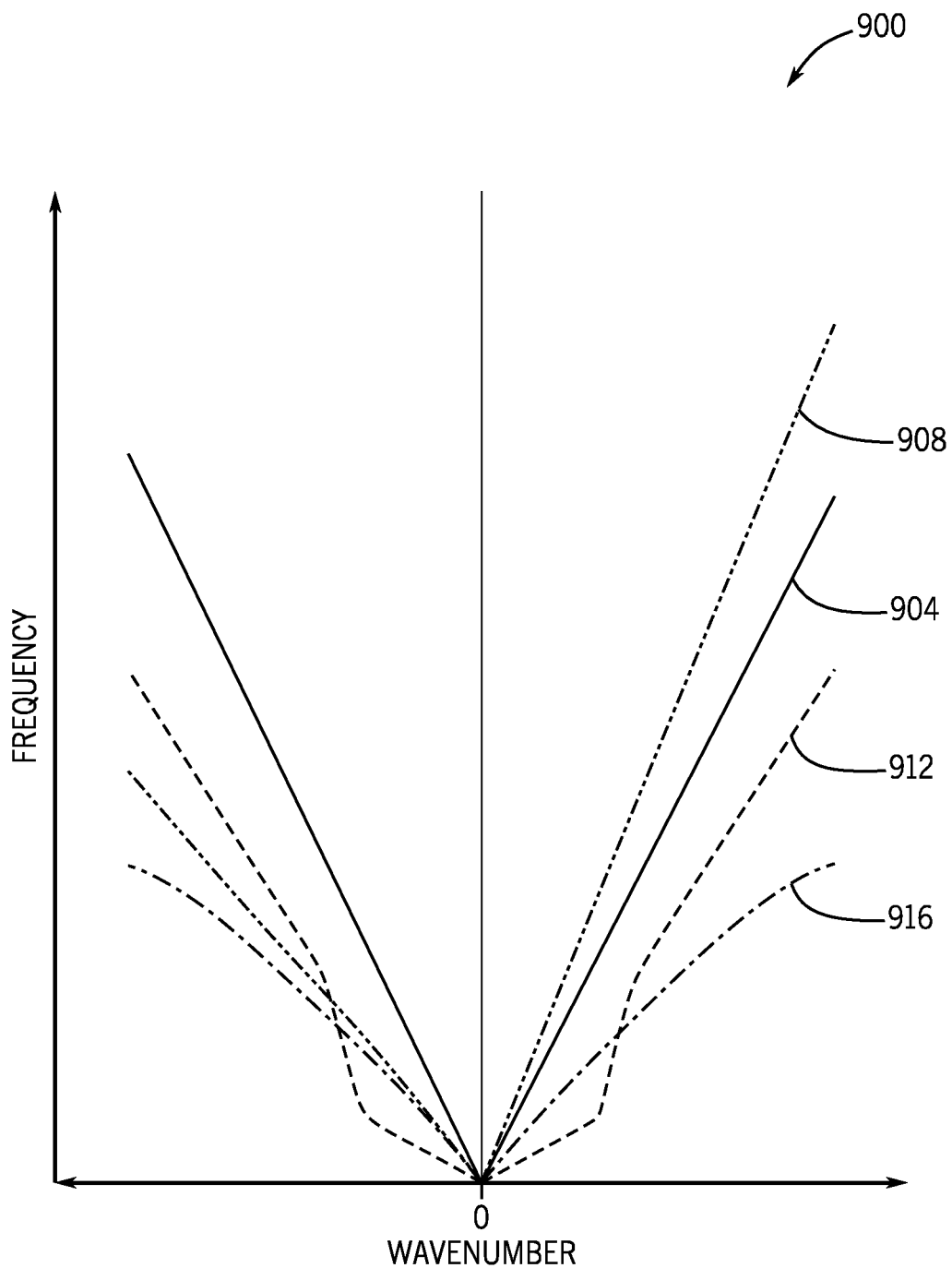
FIG. 9 illustrates filtering characteristics of different dip filters in the frequency-wavenumber domain according to example implementations.

FIG. 9 depicts an illustration 900 of example dip filters, which may be applied in accordance with example implementations: a synthetic linear dip filter 904, an asymmetric linear dip filter 908, a dip filter 912 containing multiple linear dips, and a synthetic non-linear dip filter 916. Dip filters other than the filters mentioned above may be applied, in accordance with further implementations. Moreover, in accordance with further example implementations, a filter other than a dip filter may be applied. Thus, many variations are contemplated, which are within the scope of the appended claims.

It is possible that small perturbations, such as perturbations due to variations in source strength, disturbance in geometry, source, receiver, rough sea motion-induced statics, and so forth, may cause the signal to appear outside of the signal cone, i.e., "leak" outside of the theoretical signal cone during the filtering process. Moreover, some edge effects of the filters may cause signal damage close to the theoretical signal cone. For purposes of avoiding such effects, in accordance with further implementations, the noise may be attenuated by constructing a theoretical noise signal, or "noise model," and thereafter using the noise model to attenuate the noise.

Figure 8:
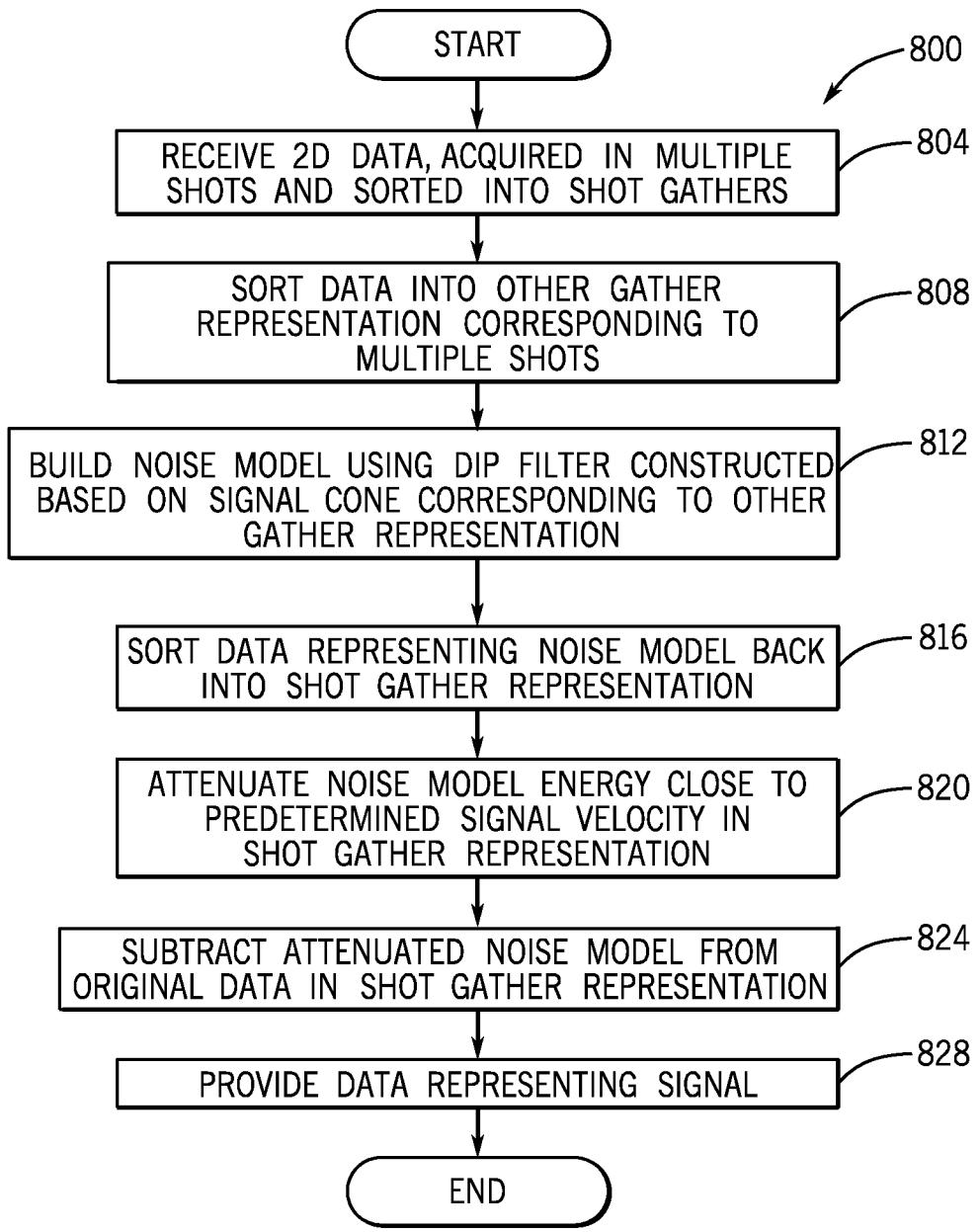

More specifically, referring to FIG. 8, in accordance with example implementation, a technique 800 includes receiving (block 804) 2-D data, in which multiple shots are sorted into a shot gather. The data may be then be sorted, pursuant to block 808, into another gather representation that corresponds to multiple shots. Using this gather representation, a noise model may then be constructed, or built, pursuant to block 812, using a dip filter that is constructed based on a signal cone that corresponds to the other gather representation. Instead of applying the dip filter, however, the data may be sorted back into the shot gather representation, pursuant to block 816. In the shot gather representation, the noise model may then be used to attenuate noise energy close to a predetermined signal velocity (a theoretical minimum horizontal plane wave velocity for the signal, for example), pursuant to block 820. In this manner, the noise signal may be subtracted (block 824) from the original shot domain data to provide (block 828) data representing the signal, in accordance with example implementations.

In another implementation filters like the ones that are disclosed in U.S. Patent Application Publication No. US 2011/0103182, entitled, "Removing Noise From A Seismic Measurement, which is hereby incorporated by reference in its entirety, may be applied instead of simple dip or simple velocity filters for purposes of attenuating the noise.

A relatively accurate definition of the signal cone may be advantageous when designing the filtering to be applied to the seismic data. In accordance with further implementations, a constrained adaptive filter, such as one of the filters disclosed in the following references (or a variation thereof)

may be used: PCT Publication No. WO 99/60423, having a publication date of Nov. 25, 1999; U.S. Pat. No. 6,446,008, which issued on Sep. 3, 2002; U.S. Pat. No. 6,651,007, which issued on Nov. 18, 2003; and U.S. Patent Application Publication No. 2011/0103182, which published on May 5, 2011. Each of these references is hereby incorporated by reference in its entirety.

In further implementations, two or more components of the received seismic data may be processed at the same time using, for example, a quaternion description of the multi-component data. For example, the processing technique disclosed in any of the following articles may be applied, in accordance with example implementations: the article by Ell, T. A., entitled, "Quaternion-Fourier Transforms for Analysis of Two-Dimensional Linear Time-Invariant Partial-Differential Systems," Proceedings of the 32nd IEEE Conference of Decision and Control, 1830-1841 (1993); and the article by Stanton, Aaron and Sacchi, Mauricio, entitled, "Multicomponent Seismic Data Reconstruction Using the Quaternion Fourier Transform and POCS," SEG Expanded Abstracts 30, 1267 (2011). Each of these references is hereby incorporated by reference in its entirety.

In other implementations two or more components of the received seismic data may be processed jointly or subsequently. Vector fidelity may be achieved by signal safe filtering outside the determined theoretical signal cone; and vector fidelity may also be achieved but by applying the same filter to all vector components. The latter approach may be beneficial if the filter boundaries are designed close to the theoretical signal cone or even go beyond the theoretical signal cone.

As noted above, in further implementations, filters other than dip filters may be applied in to data that are sorted into gathers in which the signal is relatively coherent and the noise is relatively random. For example, in accordance with further implementations, random noise attenuation may be applied to separate the noise from the signal, effectively creating two datasets: a first signal data set, which contains primarily the signal and some residual noise, and a noise dataset, which contains primarily random noise and a residual signal (with significantly reduced amplitudes). Further noise attenuation to remove anomalous amplitudes may be applied to the noise dataset, which has the advantage of mitigating the risk of attenuating the signal. Techniques for anomalous amplitude attenuation are described, for example, in U.S. Pat. No. 4,866,679, entitled, "Method for Identifying Anomalous Noise Amplitudes in Seismic Data," which issued on Sep. 12, 1989, and hereby incorporated by reference in its entirety; and U.S. Pat. No. 5,491,669, entitled, "Method for Identifying and Suppressing Anomalous Frequency Components in Seismic Data," which issued on Feb. 13, 1996, and hereby incorporated by reference in its entirety. It is noted that the depending on the particular implementation, the further noise attenuation may be performed either in the gather domain representation in which the noise is random; or, alternatively, may be performed after sorting the data back into the original gather domain representation or into yet another domain gather representation. Thus, many variations are contemplated, which are within the scope of the appended claims.

Removing anomalous amplitudes, or "anomalous amplitude attenuation," in a multi-domain noise attenuation scheme may be performed as follows, in accordance with example implementations. The attenuation scheme assumes that, in a particular domain (or gather), the "bad" traces are randomly distributed in space. Attenuation includes detecting the "bad" traces, deleting these traces (or parts of data in these traces such as data in low frequency bands where the noise may have the largest energy); and replacing the deleted traces/data with interpolated traces/data from the adjacent "good" traces.

Figure 10:
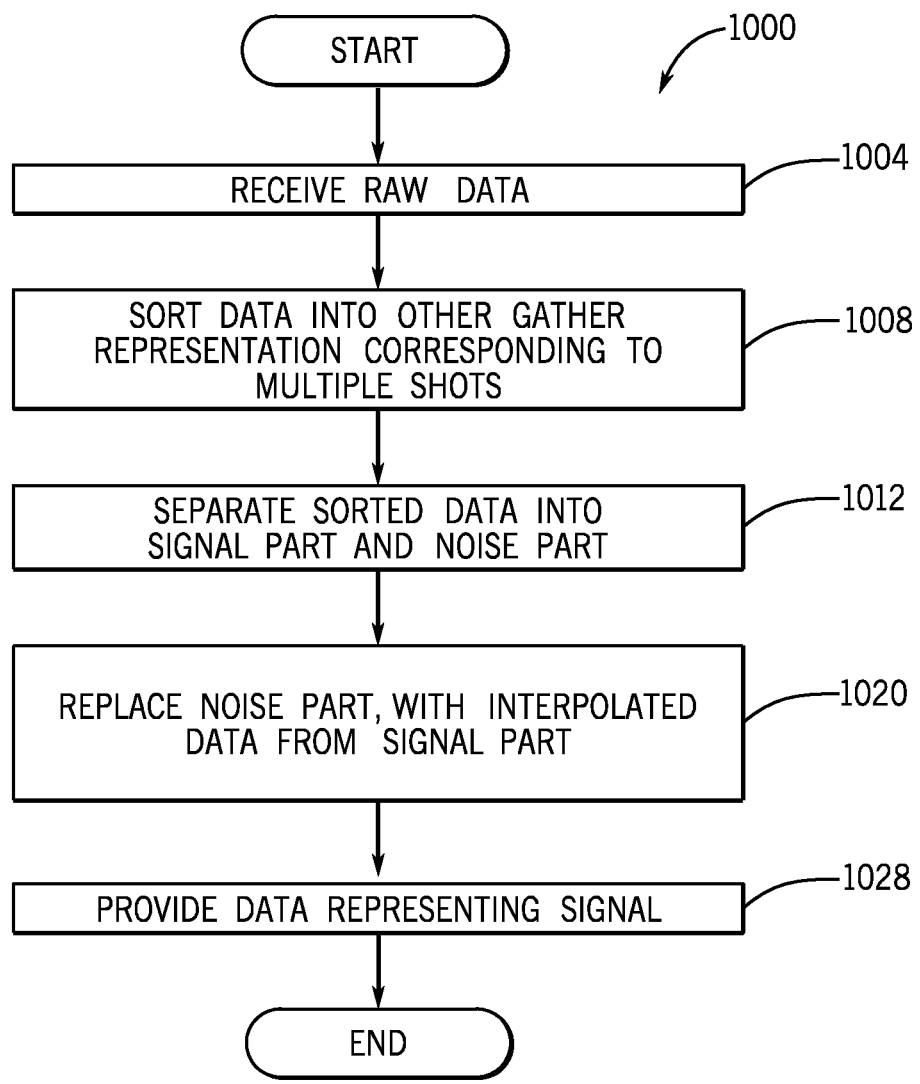

Thus, referring to FIG. 10, a technique 1000 includes receiving raw acquired seismic data, pursuant to block 1004 and sorting (block 1008) the data into another gather representation that corresponds to multiple shots. The technique 1000 includes dividing (block 1012) the data into a signal part and a noise part. The technique 1000 includes removing (block 1020) the noise part and replacing the noise part with interpolated data from the signal part. It is noted that block 1020 may employ resorting the data into another gather representation, depending on the particular implementation.

Figure 11:
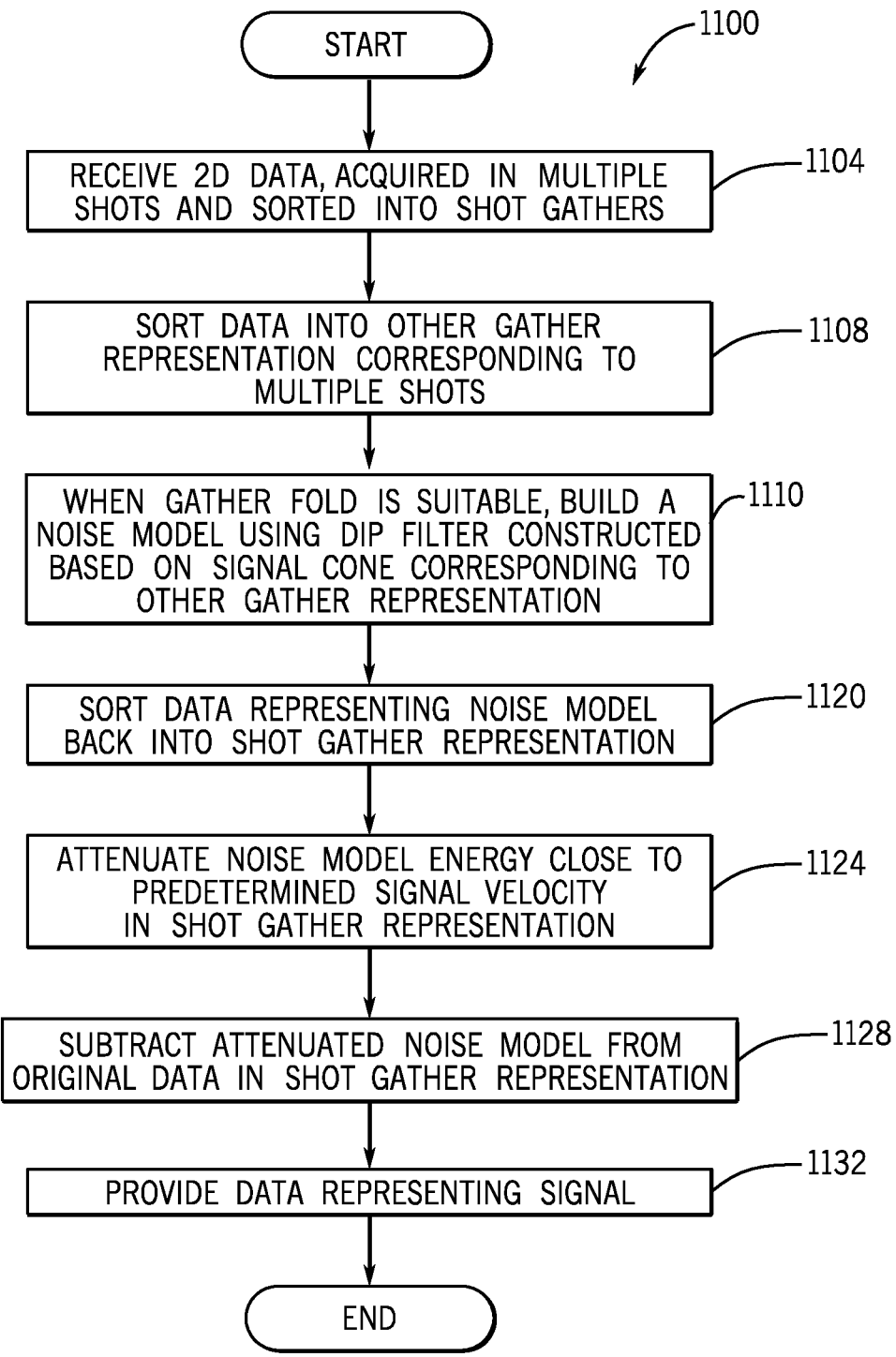

Other implementations are contemplated, which are within the scope of the appended claims. For example, referring to FIG. 11, in accordance with example implementations, a technique 1100 includes receiving (block 1104) 2-D data, in which multiple shots are sorted into a shot gather representation. The data are then sorted (block 1108) into another gather representation that corresponds to multiple shots. Pursuant to block 1110 of the technique 1100, if the gather fold is suitable, the technique 1100 includes building a noise model using a dip filter based that is constructed based on a signal cone that corresponds to the other gather representation. The data are then sorted back into the shot gather domain representation, pursuant to block 1120 where the noise model is used to attenuate (block 1124) the noise content close to the predetermined signal velocity by subtracting (block 1128) the noise model from the acquired data in the original shot domain representation to provide (block 1132) data representing the signal.

Figure 12:
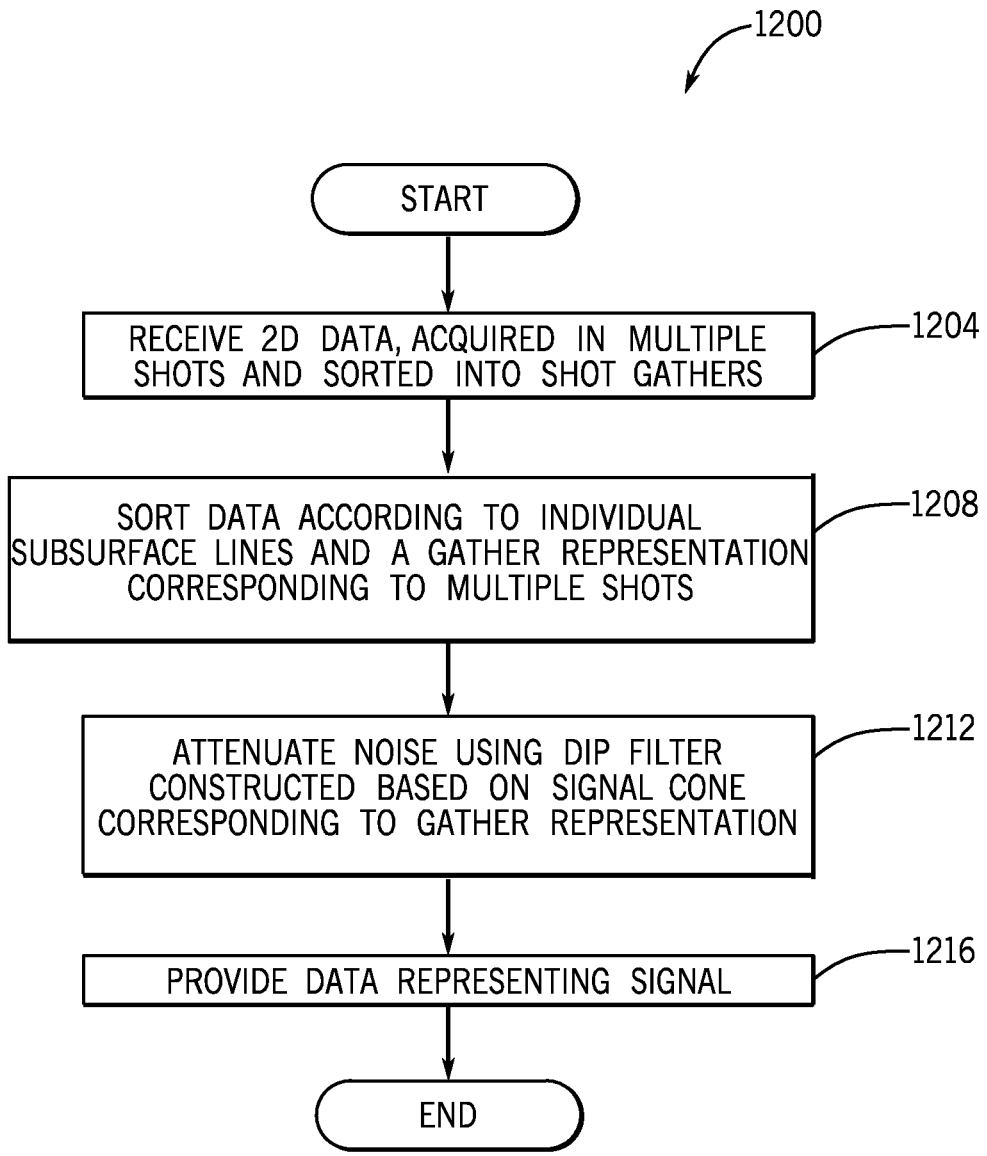

As another example, referring to FIG. 12, in accordance with further implementations, a technique 1200 includes receiving three-dimensional (3-D) data, in which multiple shots are sorted into a shot gather domain representation, pursuant to block 1204. In this context, "3-D data," refers to data in which data are acquired from more than one sensor line. For example, for a towed array in which multiple streamers are towed, the 3-D data includes data acquired from sensors disposed on multiple streamers. Thus, data acquired by a given sensor may be associated with a particular streamer, and the data may be associated with a given seismic source. Pursuant to the technique 1200, the data are sorted, pursuant to block 1208, according to individual subsurface lines and a gather representation that corresponds to multiple shots. In this other gather representation, the noise may then be removed, pursuant to block 1212, by attenuating the noise using a dip filter that is constructed based on a signal cone that corresponds to the other gather representation to provide (block 1216) data representing the signal.

Noise may also be incoherent from streamer to streamer in a 3-D acquisition. Data may be not just processed in individual subsurface lines but also be processed in gathers formed across streamers, in accordance with example implementations. For example, common crossline gathers or common trace gathers may be formed using the same trace number in each streamer, or using common nominal inline offset or else. The data in these gathers may not mix traces from different shot numbers but all come from the same shot number. The gather fold may vary depending on the sorting as streamers may have variable lengths or may be curved, subject to feathering or any other geometrical variation likely to happen during the acquisition. In accordance with example implementations, the theoretical signal cone in the common crossline or virtual crossline gather is the same as in a common shot gather at about the velocity of the speed of sound in water.

Figure 13:
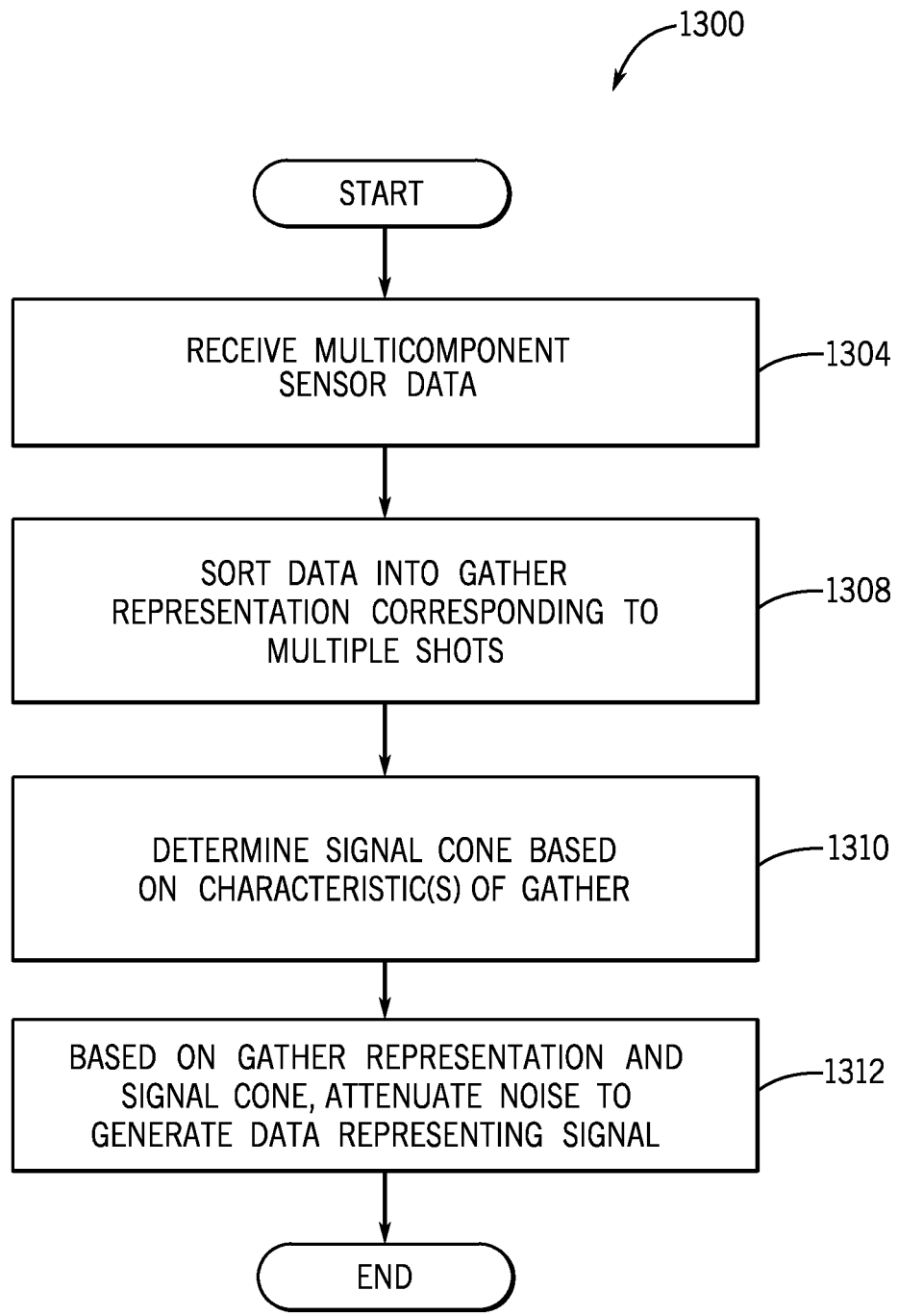

Although a towed seismic data acquisition system has been disclosed herein as a specific example, the techniques and systems that are disclosed herein may be applied, in general, to attenuate noise that is contained in multicomponent sensor data (i.e., data representing pressure and particle motion), regardless of whether the data are acquired by a towed seismic survey system, a non-towed seismic survey system, or a non-seismic survey system. Thus, referring to FIG. 13, in accordance with further implementations, a technique 1300 includes receiving (block 1304) multicomponent sensor data and sorting (block 1308) the data into a gather representation that corresponds to multiple shots. The technique 1300 includes determining (block 1310) a signal cone based on at least one characteristic of the gather representation; and based on the gather representation and the determined signal cone, attenuating noise (block 1312) to generate data representing the signal.

Figure 14:
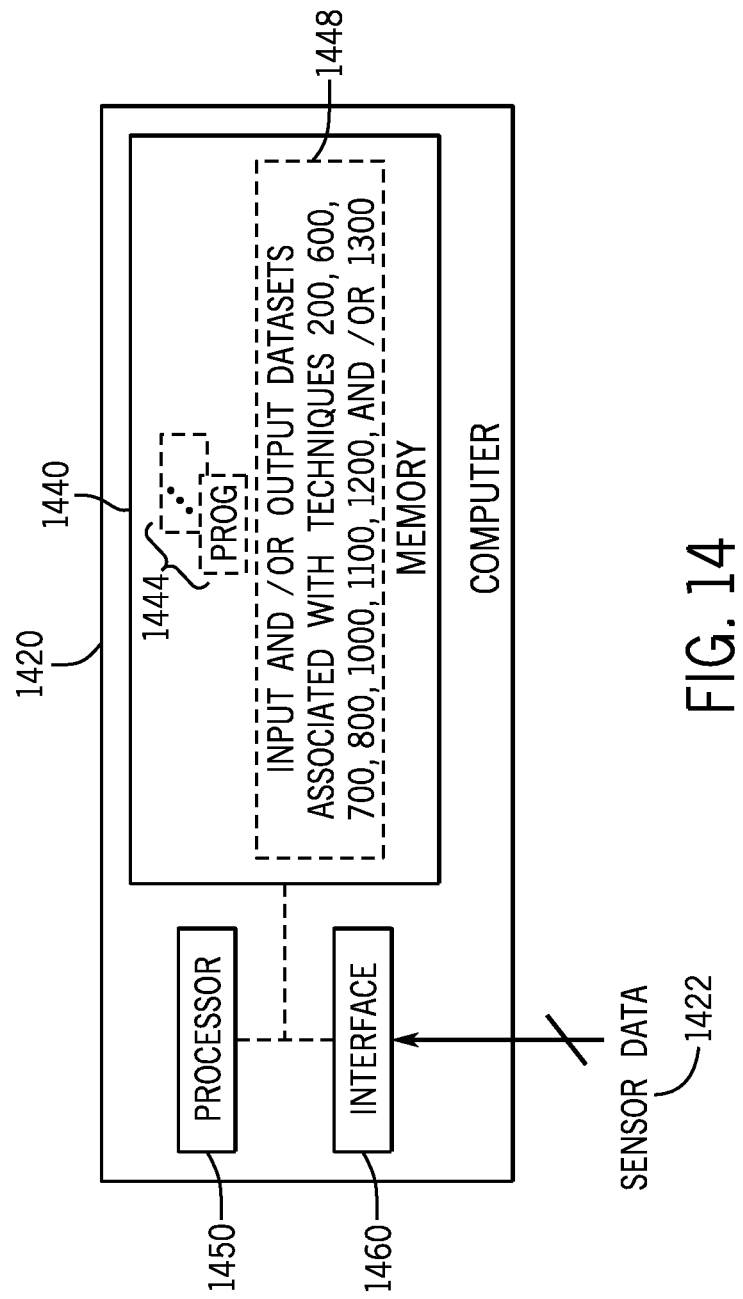
FIG. 14 is a schematic diagram of a data processing system according to an example implementation.

Referring to FIG. 14, in accordance with some implementations, a machine, such as a data processing system 1420, may contain a processor 1450 for purposes of processing data acquired by sensors for purposes of attenuating noise.

In accordance with some implementations, the processor 1450 may be formed from one or more microprocessors and/or microprocessor processing cores and thus, may be itself be formed from multiple processors. In general, the processor 1450 is a general purpose processor, and may be formed from, depending on the particular implementation, one or multiple Central Processing Units (CPUs), or application specific integrated circuits (ASICs), field programmable gate arrays (FPGAs), programmable logic devices (PLDs), or other appropriate devices, as can be appreciated by the skilled artisan. As a non-limiting example, the processor 1450 may be part of the circuitry 23 (see FIG. 1) on the vessel 20, or may be disposed at a remote site. Moreover, the data processing system 1420 may be a distributed processing system, in accordance with further implementations.

As depicted in FIG. 14, the processor 1450 may be coupled to a communication interface 1460 for purposes of receiving (as examples) 2-D or 3-D shot gather data 1422. As examples, the communication interface 1460 may be a Universal Serial Bus (USB) interface, a network interface, a removable media interface (a flash card, CD-ROM interface, etc.) or a magnetic storage interface (an Intelligent Device Electronics (IDE)-compliant interface or Small Computer System Interface (SCSI)-compliant interface, as non-limiting examples). Thus, the communication interface 1460 may take on numerous forms, depending on the particular implementation.

In accordance with some implementations, the processor 1450 is coupled to a memory 1440 that stores program instructions 1444, which when executed by the processor 1450, may cause the processor 1450 to perform various tasks of one or more of the techniques and systems that are disclosed herein, such as the techniques 200, 600, 640, 700, 800, 1000, 1100, 1200 and/or 1300, for example.

As a non-limiting example, in accordance with some implementations, the instructions 1444, when executed by the processor 1450, may cause the processor 1450 to receive data acquired by seismic sensors while in tow. In further implementations, the instructions 1444, when executed by the processor 1450, may cause the processor 1450 to receive multicomponent data (i.e., pressure and particle motion data), which may be acquired in tow or may be acquired by a stationary cable or other sensor arrays, as examples. The instructions 1444, when executed by the processor 1450 may further cause the processor 1450 to sort the data into a gather representation in which the signal is relatively coherent and the noise is relatively random. Based on this gather, the instructions 1444, when executed by the processor 1450, may cause the processor 1450 to attenuate noise to generate data representing the signal.

In general, the memory 1440 is a non-transitory memory and may take on numerous forms, such as (as non-limiting examples) semiconductor storage, magnetic storage, optical storage, phase change memory storage, capacitor-based storage, and so forth, depending on the particular implementation. Moreover, the memory 1440 may be formed from more than one of these non-transitory memories, in accordance with further implementations. When executing one or more of the program instruction 1444, the processor 1450 may store preliminary, intermediate and/or final results obtained via the execution of the instructions 1444 as data 1448 that may be stored in the memory 1440.

It is noted that the data processing system 1420 is merely an example of one out of many possible architectures, in accordance with the techniques and systems that are disclosed herein. Moreover, the data processing system 1420 is represented in a simplified form, as the processing system 1420 may have various other components (a display to display initial, intermediate and/or final results of the system's processing, as non-limiting examples), as can be appreciated by the skilled artisan.

Other variations are contemplated, which are within the scope of the appended claims. In this regard, although FIG. 1 depicts a towed seismic survey system, the system and techniques that are disclosed herein may be applied to other types of seismic acquisition systems, such as seabed-based seismic acquisition systems, land-based seismic acquisition systems, seismic acquisition systems deployed in/in connection with a well, and so forth.

Moreover, the systems and techniques that are disclosed herein may be applied to energy measurement acquisitions systems, other than seismic acquisition systems. For example, the techniques and systems that are disclosed herein may be applied to non-seismic-based geophysical survey systems, as electromagnetic or magnetotelluric-based acquisition systems, in accordance with further implementations. The techniques and systems that are disclosed herein may also be applied to energy measurement acquisition systems, other than systems that are used to explore geologic regions. Thus, although the surveyed target structure of interest described herein is a geologic structure, the target structure may be a non-geologic structure (human tissue, a surface structure, and so forth), in accordance with further implementations.

While a limited number of examples have been disclosed herein, those skilled in the art, having the benefit of this disclosure, will appreciate numerous modifications and variations therefrom. It is intended that the appended claims cover such modifications and variations.

What is claimed is:

1. A method comprising:
   receiving sensor data;
   sorting the sensor data into a gather representation that corresponds to a plurality of shots of an energy source;
   determining a signal cone based at least in part on an additional travel path between traces for different shots of the plurality of shots by the energy source; and processing the sensor data in a processor-based machine to attenuate noise to generate data representing a signal based at least in part on the determined signal cone and the gather representation.

2. The method of claim 1, wherein attenuating the noise comprises applying a linear or non-linear filter to the sorted data.

3. The method of claim 1, wherein attenuating the noise comprises selectively applying a filter to the sorted data based on a fold associated with the gather representation.

4. The method of claim 1, wherein attenuating the noise comprises:
based on the gather representation, constructing a model of the noise; and
using the model to attenuate the noise.

5. The method of claim 1, wherein attenuating the noise comprises applying a dip filter selected from the group consisting essentially of a symmetric linear dip filter, an asymmetric linear dip filter, a dip filter comprising multiple linear dips; and a symmetric non-linear dip filter.

6. The method of claim 1, wherein attenuating the noise comprises:
based on the gather representation, identifying a coherent part of the representation and a noise part of the representation;
attenuating noise from the noise part of the representation to generate a compensated noise part; and
combining the compensated noise part and the coherent part to generate data representing the signal.

7. The method of claim 1, further comprising sorting the acquired data according to a streamer of a plurality of streamers and a source of a plurality of sources prior to the sorting of the data into the gather representation.

8. An article comprising a non-transitory computer readable storage medium to store instructions that when executed by a computer cause the computer to:
receive sensor data;
sort the sensor data into a gather representation corresponding to a plurality of shots of an energy source;
determine a signal cone based at least in part on an additional travel path between traces for different shots of the plurality of shots by the energy source; and
attenuate noise to generate data representing a signal based at least in part on the determined signal cone and the gather representation.

9. The article of claim 8, the storage medium storing instructions that when executed by the computer cause the computer to apply a linear or non-linear filter to the second gather representation to attenuate energy outside of the signal cone.

10. The article of claim 8, the storage medium storing instructions that when executed by the computer cause the computer to selectively apply a filter to the sorted data attenuate the noise based at least in part on a fold associated with the gather representation.

11. The article of claim 8, the storage medium storing instructions that when executed by the computer cause the computer to, based on the gather representation, construct a model of the noise and use the model to attenuate the noise.

12. The article of claim 8, the storage medium storing instructions that when executed by the computer cause the computer to attenuate the noise using a dip filter selected from the group consisting essentially of a symmetric linear dip filter, an asymmetric linear dip filter, a dip filter comprising multiple linear dips; and a symmetric non-linear dip filter.

13. The article of claim 8, the storage medium storing instructions that when executed by the computer cause the computer to:
identify a coherent part of the second gather representation;
identify a noise part of the second gather representation;
attenuate noise from the noise part to generate a compensated noise part; and
combine the compensated noise part and the coherent part to provide data indicative of the signal.

14. A system comprising:
an interface to receive sensor data; and
a processor adapted to:
sort the sensor data into a gather representation corresponding to a plurality of shots by an energy source;
determine a signal cone based at least in part on at least one characteristic of the gather representation;
attenuate noise to generate data representing a signal based at least in part on the determined signal cone and the gather representation;
construct a model of the noise based on the gather representation corresponding to the plurality of shots by the energy source; and
use the model to attenuate the noise in another gather representation.

15. The system of claim 14, wherein the processor is adapted to apply a dip filter to attenuate the noise, the dip filter being selected from the group consisting essentially of a symmetric linear dip filter, an asymmetric linear dip filter, a dip filter comprising multiple linear dips; and a symmetric non-linear dip filter.

16. The system of claim 14, wherein the processor is adapted to:
identify a coherent part of the gather representation;
identify a noise part of the gather representation;
attenuate noise from the noise part to generate a compensated noise part; and
combine the compensated noise part and the coherent part to provide data indicative of the signal.

* * * * *